United States Patent [19]

Lindstrom

[11] Patent Number: 5,028,343

[45] Date of Patent: Jul. 2, 1991

[54] STABILIZED SULFUR DISSOLVING COMPOSITIONS

[75] Inventor: Michael J. Lindstrom, Dowingtown, Pa.

[73] Assignee: Atochem North America, Inc., Philadelphia, Penn.

[21] Appl. No.: 308,337

[22] Filed: Feb. 9, 1989

[51] Int. Cl.$^5$ ............................................. E21B 37/00
[52] U.S. Cl. ................................. 252/8.552; 252/364
[58] Field of Search ............................... 252/364, 8.552

[56] References Cited

U.S. PATENT DOCUMENTS

| | | | |
|---|---|---|---|
| 3,531,160 | 9/1970 | Fisher | 252/8.552 |
| 3,846,311 | 11/1974 | Sharp et al. | 252/8.552 |
| 3,896,865 | 7/1975 | Comfort et al. | 149/19.4 |
| 4,239,630 | 12/1980 | Atkinson et al. | 252/8.552 |
| 4,271,325 | 6/1981 | Pitt | 570/228 |
| 4,290,900 | 9/1981 | Sharp et al. | 252/8.552 |
| 4,400,368 | 8/1983 | Diaz | 423/573 R |
| 4,417,015 | 11/1983 | Hulyalkar et al. | 524/139 |
| 4,595,626 | 6/1986 | Brubaker et al. | 428/220 |
| 4,703,089 | 10/1987 | Damico | 525/245 |
| 4,804,485 | 2/1989 | Carroll et al. | 252/8.552 |
| 4,824,611 | 4/1989 | Cells | 260/414 |
| 4,855,001 | 8/1989 | Damico et al. | 156/307.3 |

FOREIGN PATENT DOCUMENTS

| | | | |
|---|---|---|---|
| 3542551 | 6/1986 | Fed. Rep. of Germany | 252/8.552 |
| 8002721 | 12/1980 | PCT Int'l Appl. | 252/8.552 |

OTHER PUBLICATIONS

P. D. Clarke, et al., "The Composition of Merox-Oily Disulphide Mixtures", Alberta Sulfur Research Ltd., Quarterly Bulletin, vol. XVIII, Nos. 2, 3 & 4 (1982), pp. 44+.

P. D. Clarke, et al., "New Catalysts for Merox Solutions in Downhole Sulphur Plug Removal", Alberta Sulphur Research Ltd., Quarterly Bulletin, vol. XIX, Nos. 1 & 2 (1982), pp. 4+.

Primary Examiner—Robert L. Stoll
Assistant Examiner—Gary L. Geist

[57] ABSTRACT

A composition of matter is disclosed which includes a major proportion of an organic di- or polysulfide, a catalytic amount of an amine/mercaptan mixture, and a stabilizing component in an amount sufficient to inhibit loss of catalytic activity in storage.

18 Claims, No Drawings

STABILIZED SULFUR DISSOLVING COMPOSITIONS

BACKGROUND

This invention relates to a composition of matter which is an organic di- or polysulfide incorporating a catalytic amount of an amine/mercaptan mixture and a stabilizer to provide a sulfur-solvent capable of dissolving unexpectedly large amounts of sulfur at a high rate with low loss of catalyst activity on storage.

In the processing of sour gas wells, sulfur may form deposits that can plug the well and cease production. These deposits have been prevented or dissolved by flowing solvents such as carbon disulfide, mineral and spindle oils, organic solvents and aqueous alkylamines downhole to dissolve the sulfur plug. The solvent is injected downhole and the well is allowed to soak for sufficient time to dissolve any existing sulfur plugs. Alternatively, the solvent can be injected continuously in amounts sufficient to prevent the formation of sulfur deposits. The above systems all have various disadvantages such as toxicity, flammability, corrosivity and limited ability to dissolve sulfur.

PRIOR ART

Dialkyl disulfides, either alone or blended with dialkyl sulfides, as disclosed in U.S. Pat. No. 3,531,160, have become the sulfur solvents of choice. Hyne et al. [Alberta Sulfur Research, Ltd. (ASRL), Quarterly Bulletin, Vol. XVIII, Nos. 2, 3 and 4, 1982, pp. 44+] have shown that lower dialkyl disulfides, especially dimethyl disulfide (DMDS) are preferred. Alone, the disulfides take up only a limited amount of sulfur; however, in conjunction with a suitable catalyst system, they can take up approximately 1.5 times their weight in sulfur at room temperature.

U.S. Pat. No. 3,846,311 teaches that a composition of one or more dialkyl disulfides and up to 10 weight percent of an unsubstituted saturated, aliphatic amine is capable of consuming over 200 weight percent sulfur after aging the composition. French patents 2,152,532 and 2,159,320 disclose similar compounds which are useful without aging. It is also taught in the art that adding a small amount of sulfur (5-40 weight percent) to the above compositions accelerates the rate of sulfur uptake (U.S. Pat. No. 4,239,630).

U.S. Pat. No. 4,290,900 teaches that the above sulfideamine composition is not as effective if vaporization occurs, which is often the case in deep wells where temperatures greater than 250° F. may be encountered. Therefore, they disclose the use of a composition of a dialkyl disulfide and a fatty acid amine (>30 wt. %) which has been aged. Further, U.S. Pat. No. 4,248,717 teaches that the addition of 60 weight percent sulfur to the above composition accelerates sulfur uptake.

Hyne et al. (ASRL Quarterly Bulletin, Vol. XX, No. 3, pp. 1+) show that sodium hydrosulfide (NaSH) and dimethylformamide (used as a co-solvent) is an effective system for catalyzing sulfur uptake using DMDS. They also demonstrated, as reported in the aforementioned ASRL Quarterly Bulletin Vol. XVIII, that a variety of alkali salts of a series of thiophenols, in conjunction with dimethylformamide (DMF), catalyze sulfur uptake. It is known that the sulfur recovery systems of Hyne et al. have one major drawback; they are not storage-stable and lose activity within 3-10 days when standing at room temperature.

STATEMENT OF THE INVENTION

This invention is a composition comprising a di- or polysulfide, and a catalytic amount of a mixture comprising an amine and a mercaptan to which is added a suitable amount of a stabilizing agent to inhibit loss of catalytic activity.

DETAILED DESCRIPTION OF THE INVENTION

This invention is a superior, storage-stable composition for dissolving sulfur. The composition may be used whenever a requirement for sulfur removal exists. One application is to dissolve or prevent sulfur plugs in sour and super-sour oil and gas wells.

A disulfide or a polysulfide of a low sulfur rank can be used for the composition of this invention. The sulfur rank is defined as the average of the number of sulfur atoms between the two alkyl groups in a mixture of di- and polysulfides. A rank greater than 2 but less than 3 is considered low. A low sulfur rank is preferred since a polysulfide with a sulfur rank greater than 3 will have a limited capacity to take up additional sulfur.

The disulfide or polysulfide component of the composition of this invention has the formula

$R^1SS_ASR^2$ wherein $R^1$ and $R^2$ are independently selected from alkyl, aryl, alkaryl, alkoxyalkyl or hydroxyalkyl radicals of 1-24 carbons and A is the average number of internal sulfur atoms in the sulfide and ranges from 0 to 3. The most preferred embodiment is when $R^1$ and $R^2$ are methyl and A is 0, i.e., dimethyl disulfide.

Suitable amines of the catalyst mixture are selected from amines of the structure

$R^3R^4R^5N$ wherein $R^3$, $R^4$ and $R^5$ are independently hydrogen, alkyl, alkaryl, aryl, cycloalkyl, hydroxyalkyl or alkoxyalkyl, and $R^3$ and $R^4$ may, together with the nitrogen, form a heterocyclic ring such as pyrrolidine, piperidine, morpholine or pyridine. The alkyl moiety of these amines generally contain from 1 to 30 carbon atoms.

Also suitable are polyamines of the general structure

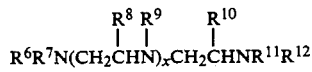

$R^6R^7N(CH_2CHN)_xCH_2CHNR^{11}R^{12}$ with $R^8$, $R^9$, $R^{10}$ substituents wherein $R^6$–$R^{12}$ are independently selected from hydrogen, alkyl, cycloalkyl, aryl or alkaryl groups where the alkyl moieties have from 1 to 25 carbon atoms and x is an integer from 0 to 25. $R^6$ and $R^7$ and $R^{11}$ and $R^{12}$ may also, with the nitrogen, form a heterocyclic ring such as pyrrolidine, piperidine or morpholine. Bicyclic amines such as 1,4-diazabicyclo [2.2.2]-octane, 1,5. diazabicyclo[4.3.0]non-5-ene, and 1,8-diazabicyclo [5.4.0]undec-7-ene are also suitable catalysts.

The formulas 1, 2, 3, and 4 shown below are given as examples to demonstrate the types of polyalkyleneoxyamines and -polyamines that will act as catalysts for sulfur-uptake by disulfides or polysulfides of low sulfur rank.

$$R^{18}HNCHCH_2(OCHCH_2)_x(OCHCH_2)_y(OCHCH_2)_z(OCH_2CH)_bNR^{19}H \quad (1)$$
with substituents $R^{13}, R^{14}, R^{15}, R^{16}, R^{17}$ along the chain

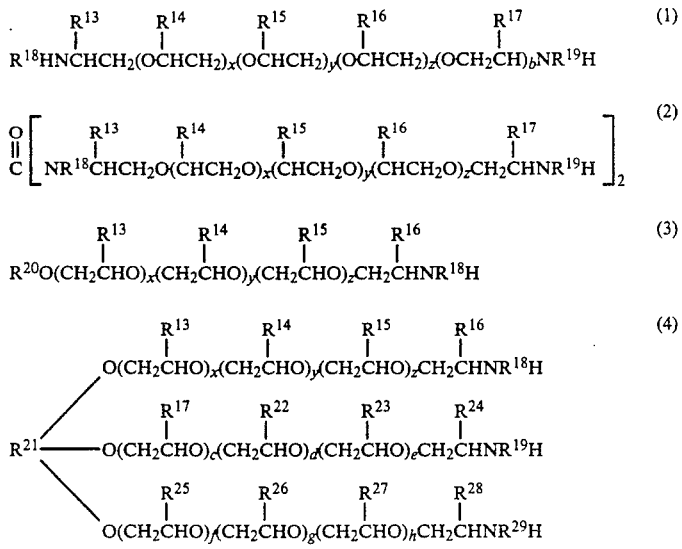

(2), (3), (4)

where $R^{13}, R^{14}, R^{16}, R^{17}, R^{20}, R^{22}, R^{23}, R^{24}, R^{25}, R^{26}, R^{27}$, and $R^{28}$ are independently H, alkyl, alkaryl, hydroxyalkyl, alkoxyalkyl, haloalkyl, wherein the alkyl moieties have from 1 to 20 carbon atoms, or phenyl; $R^{18}, R^{19}$, and $R^{29}$ are independently H, alkyl, hydroxyalkyl, alkoxyalkyl, alkaryl wherein the alkyl moieties have from 1 to 10 carbon atoms, aryl, or —CONH$_2$; $R^{21}$ is the hydrocarbon residue of a triol; and b, c, d, e, f, g, h, x, y, and z are independently values of 0–200, provided, however, that the total of such values is no less than 2.

Jeffamines®, a series of poyakyeneoxyamines produced by the Texaco Chemical Company, are exemplary of the type of compounds that are suitable in the catalytic mixture for sulfur-uptake by disulfides or polysufides of low sulfur rank. Furthermore, any polyalkylene-oxy-compound which contains an amine functionality will be active. Additionally, formula 4 shows the hydrocarbon residue of a triol, such as glycerol, ($R^{11}$) as the base of the compound, although any other similar polyalkyleneoxyamine which incorporates any polyol as its base should also be effective.

Examples of Jeffamine® products which are preferred for this invention include those identified below under the alpha-numeric product designation.

$$\text{C-346} = HOCHCH_2NHCHCH_2(OCH_2CH)_xNHCH_2CHOH$$
with CH$_3$ substituents; $x = 2.6$

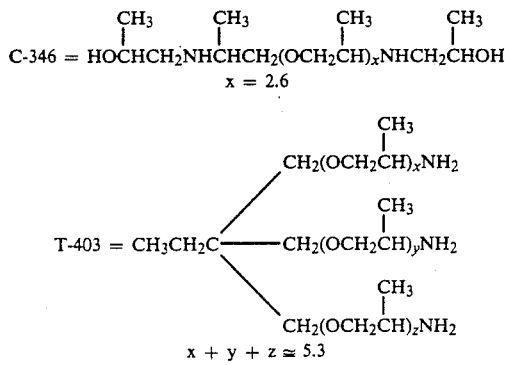

$x + y + z \cong 5.3$

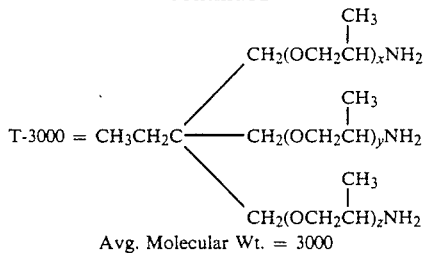

Avg. Molecular Wt. = 3000

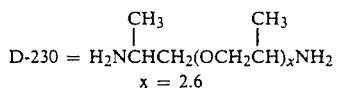
$x = 2.6$

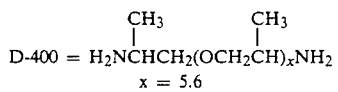
$x = 5.6$

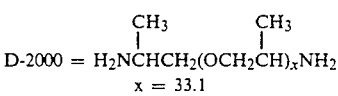
$x = 33.1$

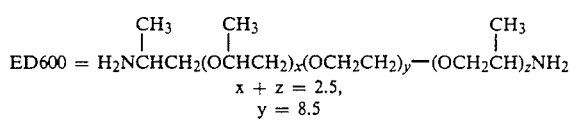
$x + z = 2.5,$ $y = 8.5$

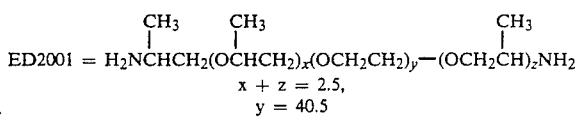
$x + z = 2.5,$ $y = 40.5$

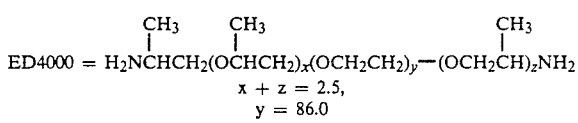
$x + z = 2.5,$ $y = 86.0$

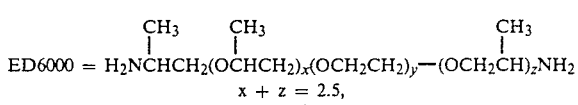
$x + z = 2.5,$ $y = 131.5$

EDR-148 = $H_2NCH_2CH_2OCH_2CH_2OCH_2CH_2NH_2$

EDR-192 = $H_2NCH_2CH_2OCH_2CH_2OCH_2CH_2OCH_2CH_2NH_2$

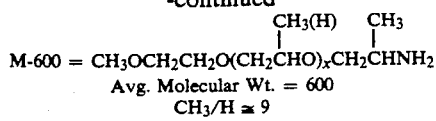

M-600 = CH₃OCH₂CH₂O(CH₂CHO)ₓCH₂CHNH₂
Avg. Molecular Wt. = 600
CH₃/H ≈ 9

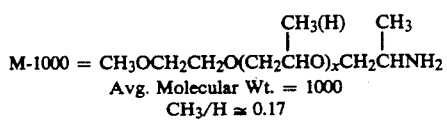

M-1000 = CH₃OCH₂CH₂O(CH₂CHO)ₓCH₂CHNH₂
Avg. Molecular Wt. = 1000
CH₃/H ≈ 0.17

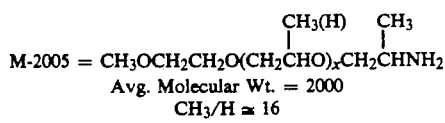

M-2005 = CH₃OCH₂CH₂O(CH₂CHO)ₓCH₂CHNH₂
Avg. Molecular Wt. = 2000
CH₃/H ≈ 16

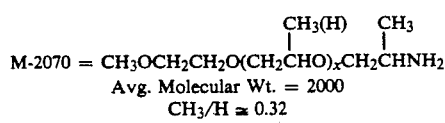

M-2070 = CH₃OCH₂CH₂O(CH₂CHO)ₓCH₂CHNH₂
Avg. Molecular Wt. = 2000
CH₃/H ≈ 0.32

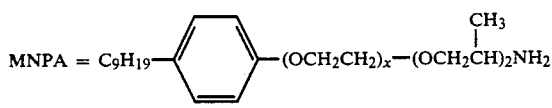

MNPA = $C_9H_{19}$—⟨ ⟩—(OCH₂CH₂)ₓ—(OCH₂CH)₂NH₂ (with CH₃)

MNPA-380 = Avg. Molecular Wt. = 380
MNPA-510 = Avg. Molecular Wt. = 510
MNPA-750 = Avg. Molecular Wt. = 750

Mixtures of one or more of the aforementioned amine catalysts are also suitable. The amines are incorporated in the composition in amounts sufficient to improve the sulfur uptake of the di- or polysulfide and preferably in an amount ranging from 10 ppm to 20 weight %, with 1-2 wt % being most preferred.

The catalyst mixture of this invention contains one or more mercaptans of the formula $$R^{30}SH$$

where $R^{30}$ is independently alkyl, cycloalkyl, aryl, alkaryl, hydroxyalkyl or alkoxyalkyl wherein the alkyl moieties have from 1 to 25 carbon atoms. Also suitable are heterocyclic mercaptans such as 2-mercapto-benzothiazole and 4-mercaptopyridine and di- and polymercaptans such as ethanedithiol and propylenedithiol. The preferred mercaptans for use in the catalytic mixture of this invention include $C_1$-$C_{25}$ alkyl mercaptans. The most preferred are $C_8$-$C_{12}$ alkyl mercaptans.

The mercaptans are incorporated in the composition in amounts sufficient to activate the amine catalyst and enhance catalyst activity. Amounts within the range of 10 parts per million (ppm) to 20 weight %, preferably from 0.5 to 3%, based on the composition weight, are normally used.

The stabilizers which are useful in the composition of this invention in amounts sufficient to inhibit loss of catalytic activity on storage include compounds having the formula

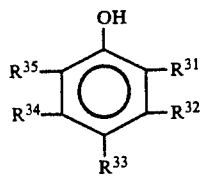

$R^{31}$–$R^{35}$ are independently hydroxy, linear or branched alkyl, cycloalkyl, aryl, alkaryl, hydroxy or alkoxyalkyl, hydroxy or alkoxy aryl, thioalkyl, thioaryl, amino alkyl or amino aryl wherein the alkyl moieties have from 1 to 25 carbon atoms. Examples of these stabilizers include hydroquinine, 2,6-di-tert-butyl-4-methylphenol (BHT), catechol and 4-tert-butyl-catechol (TBC).

Also suitable are compounds having the structure $$R^{36}R^{37}NOR^{38}$$

wherein $R^{36}$ and $R^{37}$ are independently alkyl, aryl, alkaryl, hydroxy or alkoxyalkyl wherein the alkyl moieties have from 1 to 25 carbon atoms, and $R^{38}$ is selected from hydrogen, alkyl, aryl, alkaryl, hydroxyalkyl or alkoxyalkyl wherein the alkyl moieties have from 1 to 25 carbon atoms. N,N-Diethylhydroxylamine (DEHA) is the most preferred stabilizer.

Amounts of the stabilizer, based on the weight of the composition, range generally from 10 ppm to 100,000 ppm, preferably from 500 to 1500 ppm with 1,000 ppm the most preferred.

EXAMPLES

Example 1

To 290.4 g of DMDS is added 1.5 g Jeffamine® D230 and the mixture is stirred for three hours. 2.7 g Jeffamine® ED600 and 2.7 g of t-butylmercaptan are then added. Two 100 mL aliquots were taken and to one was added the stabilizer 0.1 g DEHA and to the other the stabilizer 0.1 g t-butylcatechol (TBC). The sulfur uptake activity of these solutions after aging in storage was measured by adding 3.5 g powdered sulfur to 9.5 g of solvent and noting the time it takes for complete dissolution. The results of both fresh and aged solutions, summarized in Table 1, demonstrate the efficiency of DEHA and TBC as stabilizers of catalytic activity on storage of the sulfur-solvent composition.

A second set of tests was run following the procedure of Example 1 except that t-nonyl mercaptan was used instead of t-butylmercaptan. These results, also in Table 1, further show the efficacy of DEHA and TBC as stabilizers.

TABLE 1

| | | | Sulfur Uptake Times (sec.) | | |
| | | | Fresh | Aged 40 days | 136 days |
| Example | Mercaptan | Stabilizer | | | |
|---|---|---|---|---|---|
| 1 | t-Butyl | — | 53 | 63 | 750 |
| | t-Butyl | 0.1% DEHA | 53 | 45 | 50 |
| | t-Butyl | 0.1% TBC | 53 | 49 | 55 |
| 2 | t-Nonyl | — | 51 | 571 | 960 |
| | t-Nonyl | 0.1% DEHA | 51 | 53 | 50 |
| | t-Nonyl | 0.1% TBC | 51 | 73 | 210 |

What is claimed is:

1. A storage-stable composition for the dissolution of sulfur which comprises a major proportion of a sulfide of the formula $R^1SS_ASR^2$ where $R^1$ and $R^2$ are independently alkyl, aryl, alkaryl, alkoxyalkyl or hydroxyalkyl radicals wherein the alkyl moiety has from 1 to 24 carbon atoms and A is an average number ranging from 0 to 3, a catalytic amount of a mixture of an amine and a mercaptan, and a stabilizing component effective for an in an amount sufficient to inhibit loss of catalyst activity on storage, said stabilizing component being a) a substituted phenol of the general structure

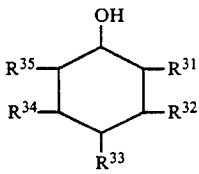

wherein $R^{31}$, $R^{32}$, $R^{33}$, $R^{34}$ and $R^{35}$ are independently hydroxy, linear or branched alkyl, cycloalkyl, aryl, alkaryl, hydroxyalkyl, alkoxyalkyl, hydroxyaryl, alkoxyaryl, thioalkyl, thioaryl, amine alkyl or amino aryl radicals wherein the alyl moieties have from 1 to 25 carbon atoms, or b) an amine distinct from the amine in said mixture and having the structure

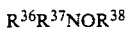

wherein $R^{36}$ and $R^{37}$ are independently alkyl, aryl, alkaryl, hydroxyalkyl or alkoxyalkyl radicals wherein the alkyl moieties have from 1 to 25 carbon atoms and $R^{38}$ is a hydrogen, alkyl, aryl, alkaryl, hydroxyalkyl or alkoxyalkyl radical wherein the alkyl moieties have from 1 to 25 carbon atoms.

2. The composition of claim 1 wherein said amine of said mixture has the formula $R^3R^4R^5N$ where $R^3$, $R^4$ and $R^5$ are independently hydrogen, alkyl, alkaryl, aryl, cycloalkyl, hydroxyalkyl or alkoxyalkyl radicals wherein the alkyl moieties have from 1 to 25 carbon atoms and $R^3$ and $R^4$ may, with the nitrogen from a heterocyclic ring.

3. The composition of claim 1 wherein said amine of said mixture is a polyamine of the formula

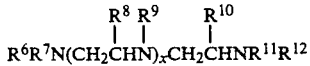

wherein $R^6$ to $R^{12}$ are independently hydrogen, alkyl, aryl, cycloalkyl or alkaryl radicals wherein the alkyl moieties have from 1 to 25 carbon atoms and x is an integer from 0 to 25, and optionally, wherein $R^6$, $R^7$, $R^{11}$ and $R^{12}$ may, with the nitrogen form a heterocyclic ring.

4. The compositions of claim 1 wherein the mercaptan is of the formula

where $R^{30}$ is independently an alkyl, aryl, alkaryl, alkoxyalkyl or hydroxyalkyl radical wherein the alkyl moieties have from 1 to 25 carbon atoms.

5. The composition of claim 1 wherein $R^1$ and $R^2$ are alkyl radicals.

6. The composition of claim 5 wherein $R^1$ and $R^2$ are $C_1$-$C_4$ alkyl radicals and A is 0 to 1.5.

7. The composition of claim 6 where $R^1$ and $R^2$ are methyl and where A is 0.

8. The composition of claim 1 wherein said of said amine mixture is triethylamine.

9. The composition of claim 1 wherein said amine of said mixture is a polyamine of the formula

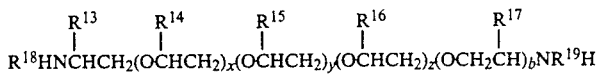

where $R^{13-17}$ are independently hydrogen, alkyl, alkaryl, hydroxyalkyl, alkoxyalkyl or haloalkyl radicals wherein the alkyl moieties have from 1 to 20 carbon atoms, or phenyl; $R^{18-19}$ are independently hydrogen, alkyl, hydroxyalkyl, alkoxyalkyl, alkaryl radicals wherein the alkyl moieties have from 1 to 10 carbon atoms, aryl or —$CONH_2$; and b, x, y and z are independent values of 0 to 200 provided, however, that the total of such values is no less than 2.

10. The composition of claim 1 wherein said amine of said mixture is a polyamine of the formula

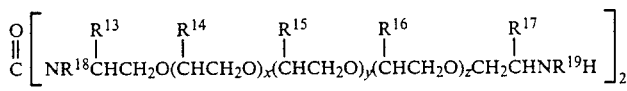

where $R^{13-17}$ are independently hydrogen, alkyl, alkaryl, hydroxyalkyl, alkoxyalkyl or haloalkyl radicals wherein the alkyl moieties have from 1 to 20 carbon atoms, or phenyl; $R^{18-19}$ are independently hydrogen, alkyl, hydroxyalkyl, alkoxyalkyl, alkaryl radicals wherein the alkyl moieties have from 1 to 10 carbon atoms, aryl or —$CONH_2$; and x, y and z are independent values of 0 to 200 provided, however, that the total of such values is no less than 2.

11. The composition of claim 1 wherein said amine of said mixture is a polyamine of the formula

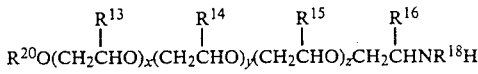

where $R^{13-16}$ and $R^{20}$ are independently hydrogen, alkyl, alkaryl, hydroxyalkyl, alkoxyalkyl or haloalkyl radicals wherein the alkyl moieties have from 1 to 20 carbon atoms, or phenyl; $R^{18}$ is hydrogen, alkyl, hydroxyalkyl, alkoxyalkyl, alkaryl wherein the alkyl moieties have from 1 to 10 carbon atoms, aryl or —$CONH_2$; and x, y and z are independent values of 0 to 200 provided, however, that the total of such values is no less than 2.

12. The composition of claim 1 wherein said amine of said mixture is a polyamine of the formula

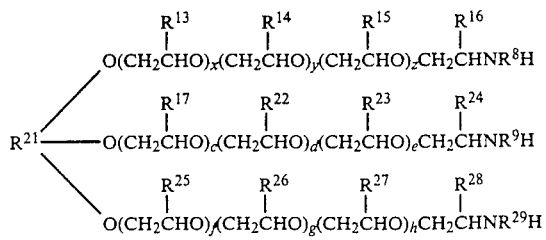

where $R^{13-17}$ and $R^{22-28}$ are independently hydrogen, alkyl, alkaryl, hydroxyalkyl, alkoxyalkyl or haloalkyl radicals wherein the alkyl moieties have from 1 to 20 carbon atoms, or phenyl; $R^{18-19}$ and $R^{29}$ are independently hydrogen, alkyl, hydroxyalkyl, alkoxyalkyl, alkaryl radicals wherein the alkyl moieties have from 1 to 10 carbon atoms, aryl or —$CONH_2$; $R^{21}$ is the hydrocarbon residue of a triol; and c, d, e, f, g, h, x, y and z are independent values of 0 to 200 provided, however, that the total of such values is no less than 2.

13. The composition of claim 4 where $R^{30}$ is an alkyl radical having from 8 to 12 carbon atoms.

14. The composition of claim 1 wherein said stabilizing component is t-butylcatechol.

15. The composition of claim 1 wherein said stabilizing component is N,N-diethylhydroxylamine.

16. The composition of claim 7 wherein said amine of said mixture has the formula $C_{13}OCH_2CH_2CH_2NH_2$ and is present in the amount of from 0.5 to 3.0%, said mercaptan is n-octyl, sec-octyl, t-dodecyl or sec-dodecyl mercaptan or mixtures of these present in the amount of from 0.5 to 3.0%, and said stabilizer component is N,N-diethylhydroxylamine present in the amount of 500 to 1500 parts per million, all said amounts based on the weight of the composition.

17. The composition of claim 16 wherein said composition additionally contains from 0.5 to 3.0% of an amine having the formula

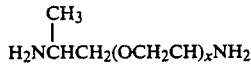

where x is an average value of from 2 to 3.

18. The composition of claim 16 wherein said composition additionally contains from 0.5 to 3.0% of an amine having the formula

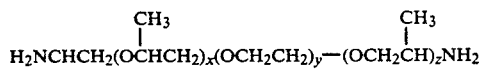

where x and y are each positive values and together total an average value between about 2 and 3, and z is an average value between about 8 and 9.

* * * * *